United States Patent
Sauder et al.

(10) Patent No.: US 10,455,757 B2
(45) Date of Patent: Oct. 29, 2019

(54) METHODS AND SYSTEMS FOR SEED VARIETY SELECTION

(71) Applicant: Precision Planting LLC, Tremont, IL (US)

(72) Inventors: Derek Sauder, Tremont, IL (US); Dale Koch, Tremont, IL (US); Doug Sauder, Washington, IL (US)

(73) Assignee: Precision Planting LLC, Tremont, IL (US)

( * ) Notice: Subject to any disclaimer, the term of this patent is extended or adjusted under 35 U.S.C. 154(b) by 0 days.

(21) Appl. No.: 15/024,398

(22) PCT Filed: Sep. 30, 2014

(86) PCT No.: PCT/US2014/058488
§ 371 (c)(1),
(2) Date: Mar. 24, 2016

(87) PCT Pub. No.: WO2015/048817
PCT Pub. Date: Apr. 2, 2015

(65) Prior Publication Data
US 2016/0234996 A1    Aug. 18, 2016

Related U.S. Application Data

(60) Provisional application No. 61/884,521, filed on Sep. 30, 2013.

(51) Int. Cl.
*A01C 7/04* (2006.01)
*A01C 21/00* (2006.01)
*A01C 7/08* (2006.01)
*A01C 7/12* (2006.01)

(52) U.S. Cl.
CPC .............. *A01C 7/046* (2013.01); *A01C 7/081* (2013.01); *A01C 7/128* (2013.01); *A01C 21/005* (2013.01)

(58) Field of Classification Search
None
See application file for complete search history.

(56) References Cited

U.S. PATENT DOCUMENTS

| | | | |
|---|---|---|---|
| 4,477,801 A * | 10/1984 | Robinson, Jr. | A01C 7/105 111/904 |
| 5,915,313 A | 6/1999 | Bender et al. | |
| 6,009,354 A | 12/1999 | Flamme et al. | |
| 6,047,652 A | 4/2000 | Prairie et al. | |
| 6,070,539 A | 6/2000 | Flamme et al. | |
| 7,237,495 B2 * | 7/2007 | Harnetiaux | A01C 7/046 111/174 |
| 2002/0144458 A1 * | 10/2002 | Hunter | A01C 1/00 47/14 |
| 2003/0182260 A1 * | 9/2003 | Pickett | A01B 79/005 |

(Continued)

OTHER PUBLICATIONS

PCT International Search Report and Written Opinion, dated Jan. 7, 2015.

*Primary Examiner* — Nicholas K Wiltey

(57) ABSTRACT

Described herein are methods and systems for planting seed. A system includes a row unit configured to open a planting trench. A first seed meter has a first coding scheme and receives a first seed type from a first hopper having the first coding scheme. A second meter has a second coding scheme and receives a second seed type from a second hopper having the second coding scheme.

17 Claims, 8 Drawing Sheets

(56) References Cited

U.S. PATENT DOCUMENTS

| | | |
|---|---|---|
| 2006/0243179 A1 | 11/2006 | Landphair et al. |
| 2010/0010667 A1 | 1/2010 | Sauder et al. |
| 2010/0213107 A1* | 8/2010 | Susnjara ............... G06Q 10/08 209/583 |
| 2011/0098851 A1 | 4/2011 | Glendenning et al. |
| 2011/0178632 A1 | 7/2011 | Straeter |
| 2013/0144489 A1* | 6/2013 | Galasso ............... B60G 17/018 701/37 |
| 2014/0277959 A1* | 9/2014 | Wagers ............... A01C 21/005 701/50 |
| 2014/0345340 A1* | 11/2014 | Holland ............... A01C 21/00 71/1 |

* cited by examiner

METHODS AND SYSTEMS FOR SEED VARIETY SELECTION

BACKGROUND

Planters are used for planting seeds (e.g., corn, soybeans) in a field. On smaller planters, a farmer fills a seed hopper on every individual row unit of the planter. Multiple row units are mounted side-by-side along a single toolbar. At each row unit the seeds are fed from the hopper to a meter on the row unit, which meters seeds one by one into the trench opened by the row unit.

With larger planters (having, e.g., 48 row units) it has become common practice to have two side-by-side bulk hoppers. A blower blows seed from the bulk hoppers out to the individual row units through a plurality of lines. This cuts down the time per filling operation and the number of filling operations. Since the left hopper feeds one half of the row units and the right hopper feeds the other half, a farmer can fill one hopper with seed type A and the other hopper with seed type B and then see which seed type results in better performance and yield.

DESCRIPTION

Figure 1:
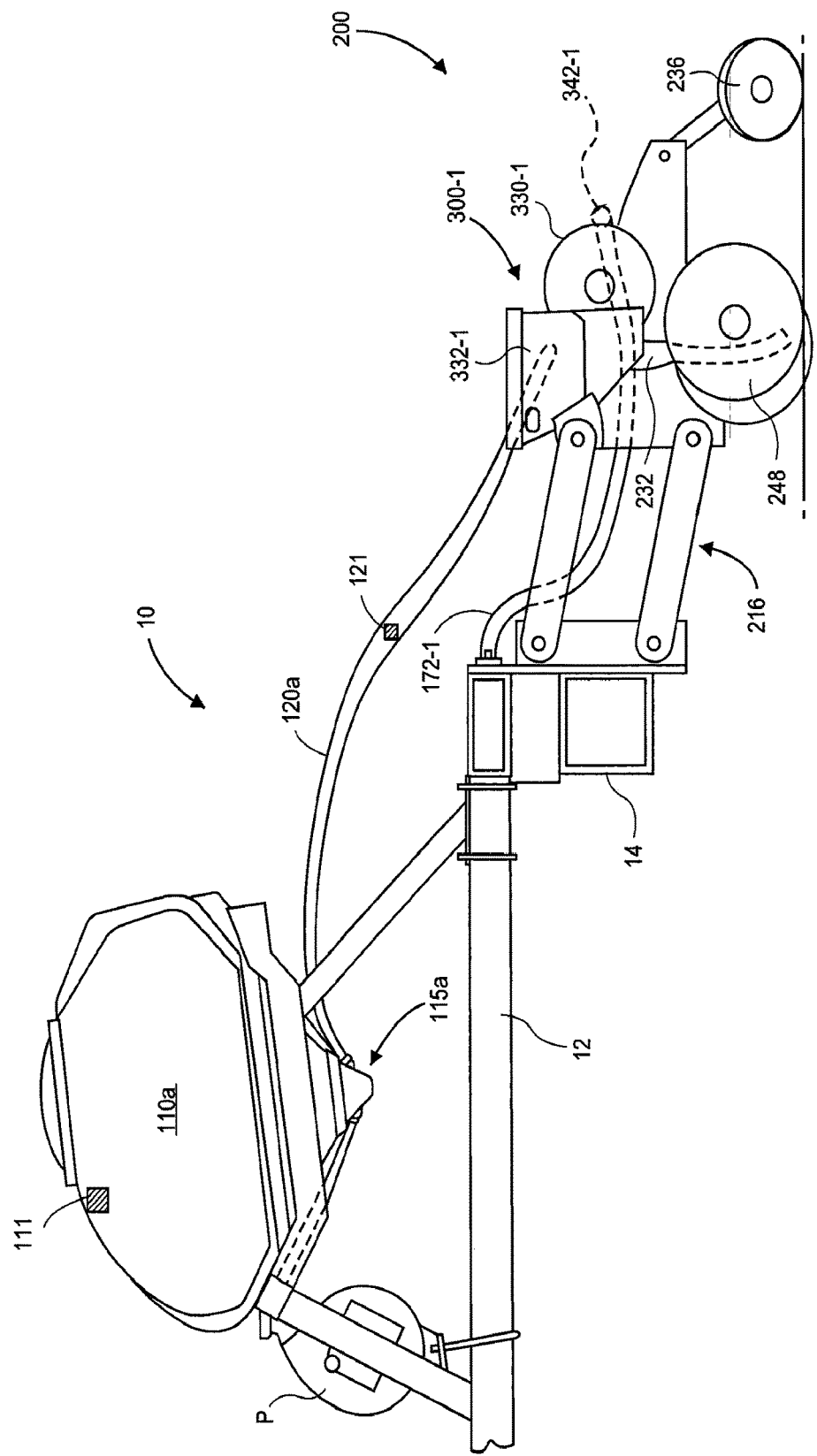
FIG. 1 illustrates a system (e.g., multi-hybrid planter system) with a coding scheme according to one embodiment.

Described herein are methods and systems for improving seed variety selection. In one embodiment, a planting system includes a row unit configured to open a planting trench. A first seed meter has a first coding scheme and receives a first seed type from a first hopper having the first coding scheme. A second meter has a second coding scheme and receives a second seed type from a second hopper having the second coding scheme. Seed can be dispensed from the first seed meter or the second seed meter into the planting trench. The first and second coding schemes reduce or eliminate operator error during seed filling of bulk hoppers in the planting system.

The planting system can be a multi-hybrid planter that plants different hybrids throughout a field according to a prescription map that is based on soil characteristics in a field including soil type, etc. For example, a first hybrid may grow well in a first soil type while a second hybrids grows well in a second soil type. An operator (e.g., farmer) is not able to determine this effectively with conventional planters by filling the bulk hoppers with two different seed types because that method can only implement large side-by-side strips. In some embodiments, the multi-hybrid planter includes two meters on every row unit, e.g., as disclosed in Applicant's U.S. Provisional Patent Application No. 61/838,141, the entire disclosure of which is hereby incorporated by reference. In such embodiments, the operator fills one bulk hopper with seed type "A" and the other with seed type "B", the "A" hopper sends seed to one meter on every row unit, and the "B" hopper sends seed to a second meter on every row unit. Using GPS, the planter decides where it is located on the prescription map and the "A"/"B" meters each switch on or off at the appropriate time so that the planter is planting the desired seed type at the desired location.

However, it may be easy for the operator to improperly plant different hybrids throughout a field according to a prescription map such that the wrong seed is planted in the wrong location in at least a portion of a region or field. Thus, the information learned in these situations may have no value in regards to hybrid performance because it is unknown which seed type was planted in which location. For example, the operator can fill the "A" hopper with the "B" seed type, mix two seed types in the bulk hopper, or some other variation. The operator may forget where in the field he filled which hopper with which seed type. The operator may connect the "A" seed distribution line to the "B" outlet, connect the "A" seed distribution line to the "B" meter, etc.

Embodiments of the present invention provide a coding scheme for certain components of the planting system in order to reduce or eliminate potential operator error while filling seed in the bulk hoppers or connecting the bulk hoppers to the appropriate seed lines and meters.

In the following description, numerous details are set forth. It should be appreciated, however, that the invention may be practiced without the specific details described herein and therefore should not be construed as limiting the scope of the invention. In some instances, well-known structures and devices are shown in block diagram form, rather than in detail, since those of skill in the art would readily understand these well-known structures and devices without further elaboration.

FIG. 1 illustrates a system (e.g., multi-hybrid planter system) with a coding scheme according to one embodiment. The system 10 includes a frame 12 having a transversely extending toolbar 14. A plurality of row units 200 are mounted to the toolbar 14 in transversely spaced relation. A plurality of bulk hoppers 110 are preferably supported by the frame 14 and in seed and pneumatic communication with the row units 200. Bulk hopper 110a includes a coded indicator 111 with a first coding scheme (e.g., color code, pattern code, numeric code, alphanumeric code, etc.). A second bulk hopper (not shown) may include a coded indicator with second coding scheme. A seed line 120a that is coupled to the bulk hopper 110a may also include a coded indicator 121 with the first coding scheme. A seed meter 300-1 may also include a coded indicator with the first coding scheme.

Figure 2:
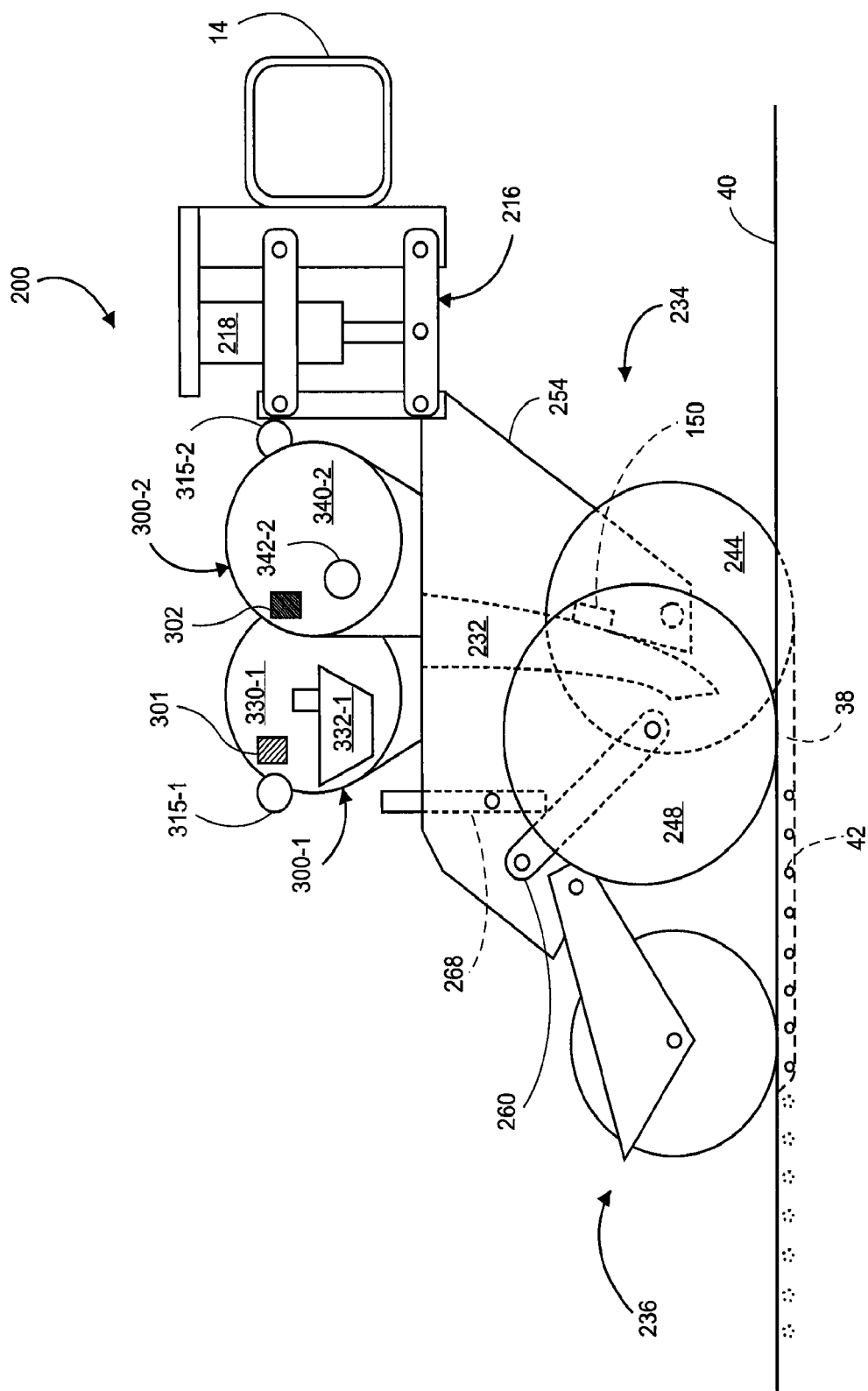
FIG. 2 illustrates an embodiment in which the row unit 200 is a planter row unit with a coding scheme.

FIG. 2 illustrates an embodiment in which the row unit 200 is a planter row unit with a coding scheme. The row unit 200 is preferably pivotally connected to the toolbar 14 by a parallel linkage 216. An actuator 218 is preferably disposed to apply lift and/or down force on the row unit 200. An opening system 234 preferably includes two opening discs 244 rollingly mounted to a downwardly-extending shank 254 and disposed to open a v-shaped trench 38 in the soil 40. A pair of gauge wheels 248 is pivotally supported by a pair of corresponding gauge wheel arms 260; the height of the gauge wheels 248 relative to the opener discs 244 sets the depth of the trench 38. A depth adjustment rocker 268 limits the upward travel of the gauge wheel arms 260 and thus the upward travel of the gauge wheels 248. A down force sensor (not shown) is preferably configured to generate a signal related to the amount of force imposed by the gauge wheels 248 on the soil 40; in some embodiments the down force sensor comprises an instrumented pin about which the rocker 268 is pivotally coupled to the row unit 200.

Continuing to refer to FIG. 2, a first seed meter 300-1 is preferably mounted to the row unit 200 and disposed to deposit seeds 42 into the trench 38, e.g., through a seed tube 232 disposed to guide the seeds toward the trench. In other embodiments, the seed tube 232 is replaced with a seed conveyor such as one of the embodiments disclosed in Applicant's International Patent Application No. PCT/US2012/057327, the entire disclosure of which is hereby incorporated herein by reference. A second seed meter 300-2 is preferably mounted to the row unit 200 and disposed to deposit seeds 42 into the same trench 38, e.g., through the same seed tube 232. Each of the seed meters 300-1, 300-2 preferably includes a seed side housing 330 having an auxiliary hopper 332 for storing seeds 42 to be deposited by the meter. Each of the seed meters 300-1, 300-2 preferably includes a vacuum side housing 340 (e.g., 340-2 is shown in FIG. 2) including a vacuum port 342 (e.g., 342-1 in FIG. 1, 342-2 in FIG. 2) for pulling a vacuum within the vacuum side housing. Each of the seed meters 300-1, 300-2 preferably includes a seed disc (not shown) that includes seed apertures (not shown). The seed disc preferably separates interior volumes of the vacuum side housing 340 and the seed side housing 330. In operation, seeds 42 communicated from the auxiliary hopper 332 into the seed side housing 330 are captured on the seed apertures due to the vacuum in the vacuum side housing and then released into the seed tube 232. Each of the meters is preferably powered by individual electric drives 315-1, 315-2 respectively. Each drive 315 is preferably configured to drive a seed disc within the associated seed meter 300. In other embodiments, the drive 315 may comprise a hydraulic drive or other motor configured to drive the seed disc.

A seed sensor 150 (e.g., an optical or electromagnetic seed sensor configured to generate a signal indicating passage of a seed) is preferably mounted to the seed tube 232 and disposed to send light or electromagnetic waves across the path of seeds 42. A closing system 236 including one or more closing wheels is pivotally coupled to the row unit 200 and configured to close the trench 38.

Figure 3:
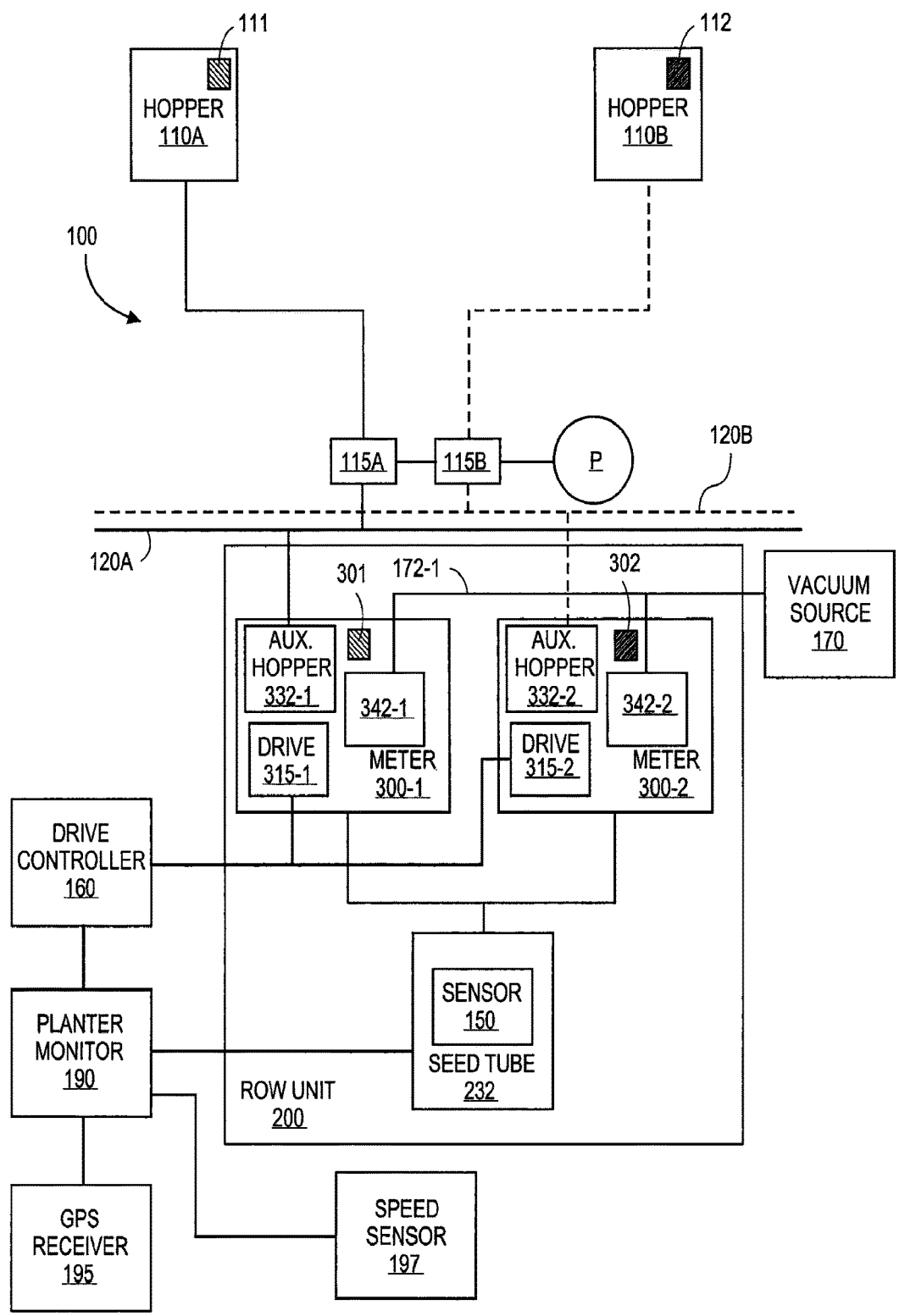
FIG. 3 illustrates a block diagram of a seed variety selection system with a coding scheme in accordance with one embodiment.
Figure 4:
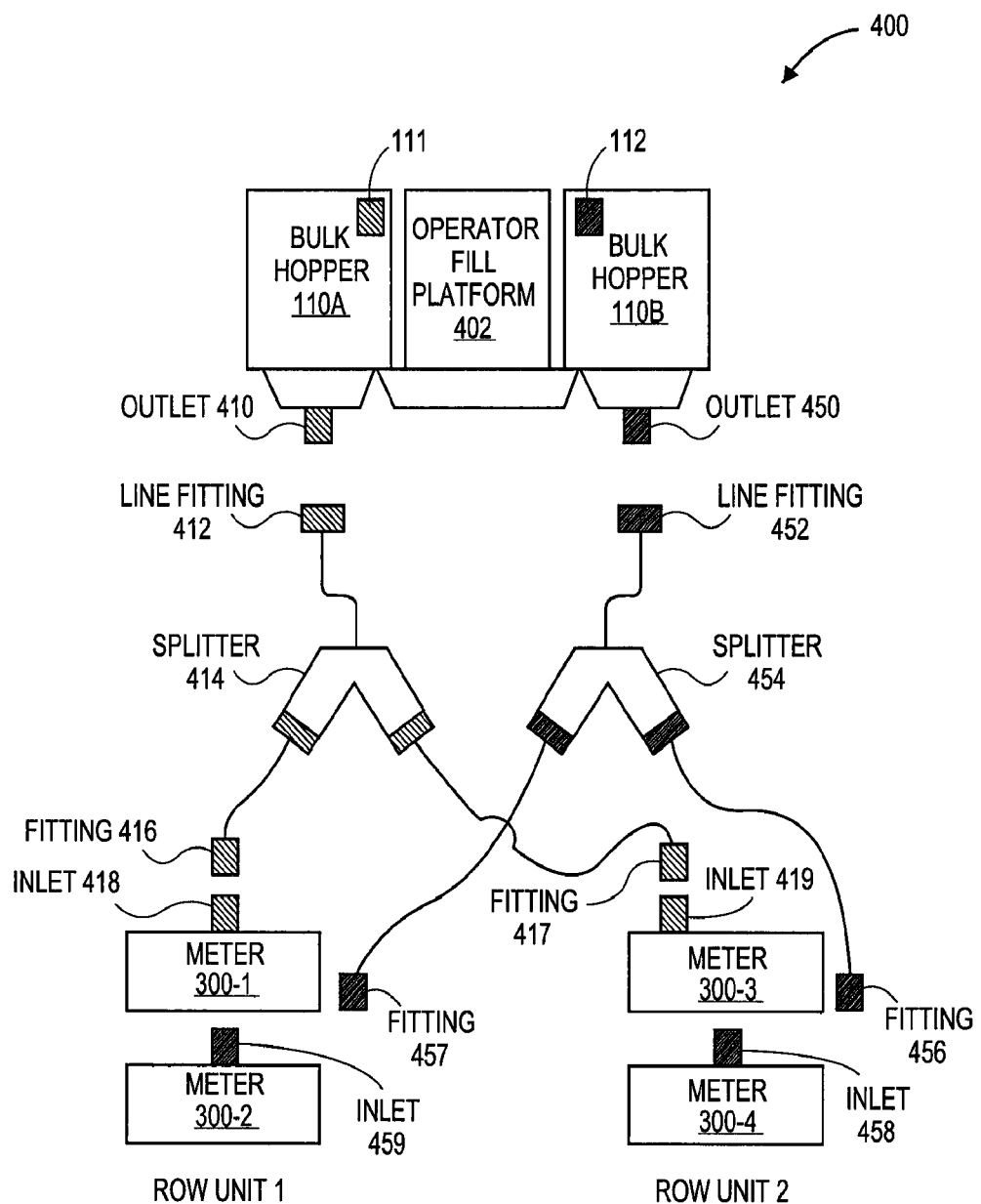
FIG. 4 illustrates a top view of a seed variety selection system having coded components for a coding scheme in accordance with one embodiment.
Figure 5:
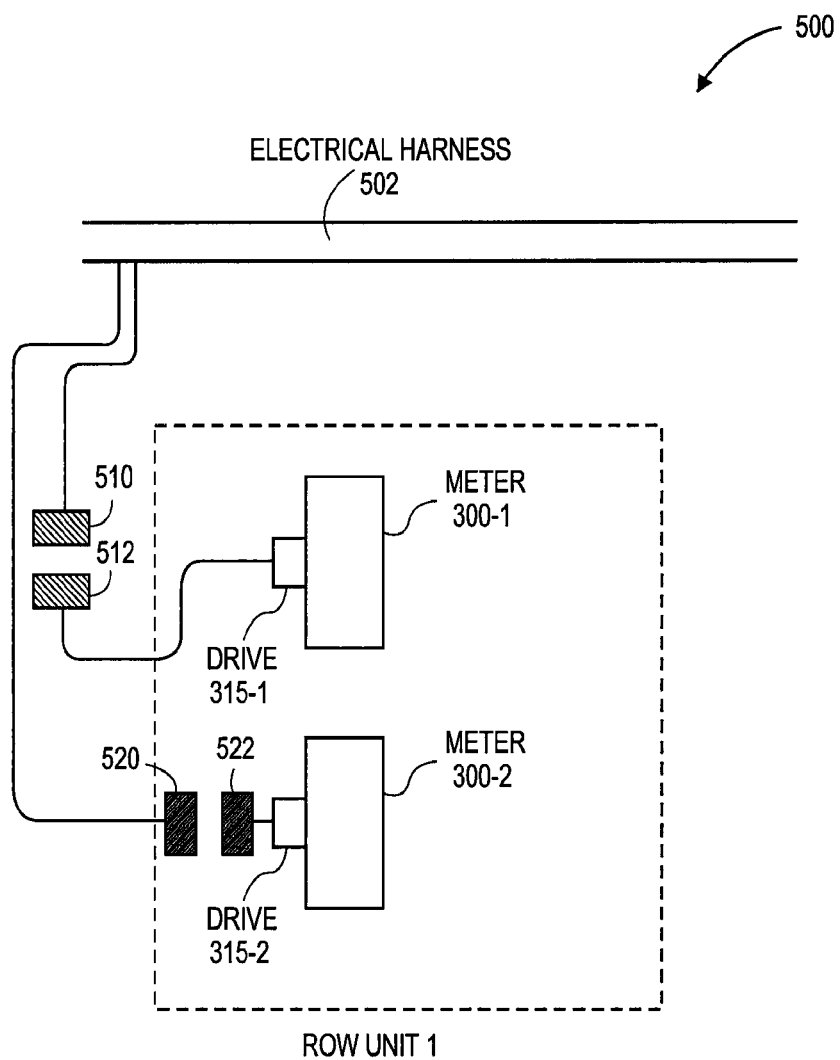
FIG. 5 illustrates a top view of an electrical system of a seed variety selection system having coded components for a coding scheme in accordance with one embodiment.

Certain components (e.g., seed meters 300-1, 300-2) of FIG. 2 include coded indicators with coding schemes (e.g., color code, pattern code, numeric code, alphanumeric code, etc.). For example, the seed meter 300-1 may include a first coded indicator 301 with a first coding scheme while the seed meter 300-2 may include a second coded indicator 302 with a second coding scheme. The coded indicators may be located anywhere on the seed meters or inlets that enter the seed meters or auxiliary hoppers. FIGS. 3-5 illustrate more examples of components with coded indicators and corresponding coding schemes in order to reduce or eliminate operator error while filling seed in a planter.

FIG. 3 illustrates a block diagram of a seed variety selection system with a coding scheme in accordance with one embodiment. The system 100 preferably includes a plurality of bulk hoppers 110 (e.g., two bulk hoppers 110a and 110b as illustrated). The first bulk hopper 110a preferably contains a first seed variety (e.g., a first corn seed variety or a first soybean variety); the second bulk hopper 110b preferably contains a second seed variety (e.g., a second corn seed variety or a second soybean variety). Bulk hopper 110a includes a coded indicator 111 with a first coding scheme (e.g., color code, pattern code, numeric code, alphanumeric code, etc.) while bulk hopper 110b includes a coded indicator 112 with a second coding scheme. Each bulk hopper is preferably in fluid communication with an individual seed entrainer 115. Each seed entrainer 115 is preferably mounted to a lower outlet of the associated bulk hopper 110. Each seed entrainer 115 is preferably in fluid communication with a pneumatic pressure source P and configured to convey air-entrained seeds through a plurality of seed lines 120 to the row units 200. Via a plurality of seed lines 120a, the bulk hopper 110a and the entrainer 115a are preferably in seed communication with a first seed meter 300-1 (e.g., with the auxiliary hopper 332-1) of each row unit 200 along the toolbar 14. In operation, the bulk hopper 110a supplies the first seed variety to the first meter 300-1 of each row unit 200. Via seed lines 120b, the bulk hopper 110b and the entrainer 115b are preferably in seed communication with the second seed meter 300-2 (e.g., with the auxiliary hopper 332-2) of each row unit 200 along the toolbar 14. In operation, the bulk hopper 110b supplies the second seed variety to the second meter 300-2 of each row unit 200. The seed meter 300-1 may include a first coded indicator 301 with a first coding scheme while the seed meter 300-2 may include a second coded indicator 302 with a second coding scheme. The coded indicators may be located anywhere on the seed meters or inlets that enter the seed meters or auxiliary hoppers.

Each drive 315-1, 315-2 is preferably in data communication with a drive controller 160. The drive controller is preferably configured to generate a drive command signal corresponding to a desired rate of seed disc rotation. The drive controller 160 is preferably in data communication with a planter monitor 190. The planter monitor 190 preferably includes a memory, a processor, and a user interface. The planter monitor is preferably configured to send drive command signals and/or desired rates of seed disc rotation to the drive controller 160. The planter monitor 190 is preferably in data communication with a GPS receiver 195 mounted to either the planter 10 or the tractor used to draw the planter. The planter monitor 190 is preferably in data communication with a speed sensor 197 (e.g., a radar speed sensor) mounted to either the planter 10 or the tractor. As used herein, "data communication" may refer to any of electrical communication, electronic communication, wireless (e.g., radio, microwave, infrared, sonic, near field, etc.) communication, or communication by any other medium configured to transmit analog signals or digital data.

Each vacuum port 342 (e.g., 342-1, 342-2) is preferably in fluid communication with a vacuum source 170 via a vacuum line 172 (e.g., 172-1). Both the first seed meter 300-1 and the second seed meter 300-2 of each row unit 200 are preferably in seed communication with (e.g., disposed to deposit seed into) a seed tube 232 associated with the row unit 200. The seed sensor 150 associated with the seed tube 232 of each row unit 200 is preferably in data communication with the planter monitor 190.

FIG. 4 illustrates a top view of a seed variety selection system having coded components of a coding scheme in accordance with one embodiment. The system 400 of FIG. 4 may include the same or similar components of FIG. 3, but fewer components have been illustrated in the system 400 in order to simplify the drawing and better illustrate the coding (e.g., color code, pattern code, numeric code, alphanumeric code, etc.) for preventing an operator error in operating the multi-hybrid systems of the disclosure. The system 400 includes an operator fill platform 402, bulk hopper 110*a*, and bulk hopper 110*b*. The operator can fill seed in these bulk hoppers. Bulk hopper 110 includes a coded indicator 111 with a first coding scheme. Bulk hopper 110*a* can be coupled to a first meter in any row unit such as meter 300-1 in row unit 1 or meter 300-3 in row unit 2. The outlet 410, fitting 412, splitter 414, fitting 416, and inlet 418 provide a pathway for seed communication from the bulk hopper 110*a* to the meter 300-1. The outlet 410, fitting 412, splitter 414, fitting 417, and inlet 419 provide a pathway for seed communication from the bulk hopper 110*a* to the meter 300-3. Each of these components may be coded (e.g., include coded indicators) to ensure that seed (e.g., seed type "A") in hopper 110*a* is filled into meters 300-1 and 300-3. For example, these components including the bulk hopper 110*a* with the coded indicator 111 can be coded with a first color for seed type "A." These components can include a coded indicator or at least a portion of one or more of these components includes a coding scheme.

Bulk hopper 110*b* includes a coded indicator 112 with a second coding scheme. Bulk hopper 110*b* can be coupled to a second meter in any row unit such as meter 300-2 in row unit 1 or meter 300-4 in row unit 2. The outlet 450, fitting 452, splitter 454, fitting 457, and inlet 459 provide seed communication from the bulk hopper 110*a* to the meter 300-2. The outlet 450, fitting 452, splitter 454, fitting 456, and inlet 458 provide seed communication from the bulk hopper 110*b* to the meter 300-4. Each of these components may be coded (e.g., include coded indicators) to ensure that seed (e.g., seed type "B") in hopper 110*b* is filled into meters 300-2 and 300-4. For example, these components including the bulk hopper 110*b* with the coded indicator 112 can be coded with a second color for seed type "B." These components can include a coded indicator or at least a portion of one or more of these components includes a coding scheme.

Each of the coded indicators described herein is preferably disposed to be viewed (preferably readily and easily) by the operator during operations in which the operator needs to identify which component corresponds to which component or seed type. For example, the coded indicators 111, 112 on the bulk hoppers 110*a*, 110*b*, respectively, are preferably located within the line of sight of an operator standing on the operator fill platform 402. Likewise, the coded indicator 301 is preferably disposed to be viewed (preferably readily and easily) by the operator when the operator is standing adjacent to the seed meter 300-1.

In some embodiments, all of the components providing seed communication from a bulk hopper to each seed meter receiving seed from the bulk hopper are coded in a corresponding (e.g., the same) fashion as the bulk hopper. For example, if the coded indicator 111 on the bulk hopper 110*a* is red, then the outlet 410, line fitting 412, splitter 414, fitting 416, inlet 418, fitting 417 and inlet 419 are preferably red, partly red, or include red coded indicators. In other embodiments, only a subset of the components is marked with a corresponding code as the bulk hopper. In other embodiments, the components are marked with a code corresponding to a different component—for example, line fitting 412, splitter 414, fitting 416, inlet 418, fitting 417 and inlet 419 can be coded in a corresponding (e.g., the same) fashion as the outlet 410 rather than the bulk hopper 110*a*.

In another embodiment, the coding is applied to the seed lines rather than at least some of the components discussed above. Alternatively, the coding is applied to the seed lines in addition to at least some of the components discussed above.

FIG. 5 illustrates a top view of an electrical system of a seed variety selection system having coded components in accordance with one embodiment. The electrical system 500 includes plugs 510, 512, 520, and 522 that have been coded (e.g., color code, pattern code, numeric code, alphanumeric code, etc.) to prevent or reduce a likelihood of an operator error while operating a multi-hybrid planter. The electrical system 500 includes an electrical harness 502 (e.g., bus) that provides power to the drive 315-1 of meter 300-1 if the plugs 510 and 512 are connected. The electrical harness 502 also provides power to the drive 315-2 of meter 300-2 if the plugs 520 and 522 are connected. Each pair of plugs (e.g., 510 and 512, 520 and 522) may be coded to ensure that seed (e.g., seed type "A") in hopper 110*a* is filled into an appropriate meter such as meter 300-1 and seed (e.g., seed type "B") in hopper 110*b* is filled into an appropriate meter such as meter 300-2. For example, the plugs 510 and 512 can be coded with a first color for seed type "A" and the plugs 520 and 522 can be coded with a second color for seed type "B."

In some embodiments, the electrical system uses a corresponding (e.g., the same) coding scheme as the system 400 of FIG. 4. For example, if the coded indicator 111 on the bulk hopper 110*a* is red, then the plug 510 and the plug 512 are preferably coded with the color red.

Figure 6:
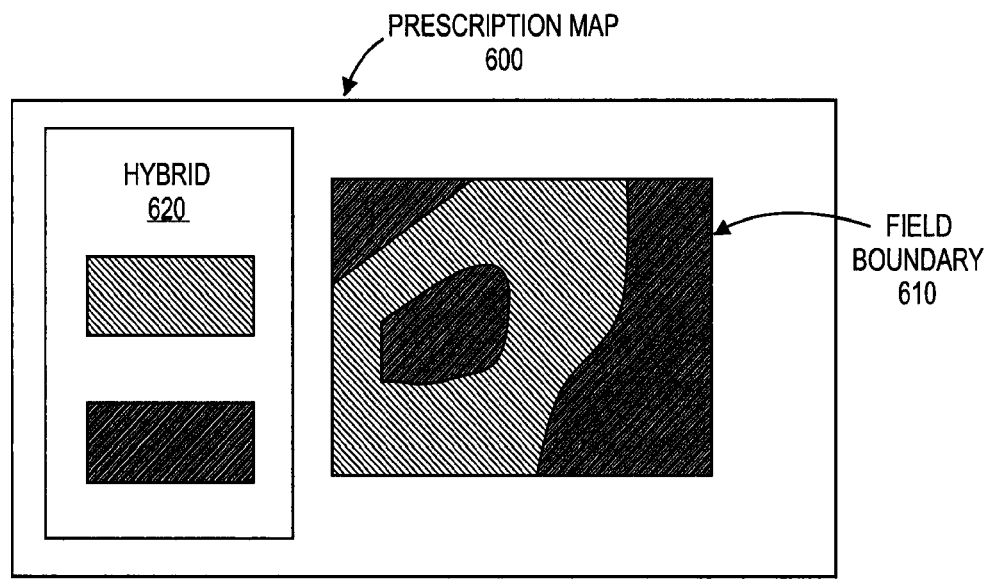
FIG. 6 illustrates an exemplary prescription map 600 in accordance with one embodiment.

FIG. 6 illustrates an exemplary prescription map 600 in accordance with one embodiment. The prescription map 600 is displayed on a monitor (e.g., planter monitor 190) in a tractor cab and used by the monitor (or the operator) to control the planter and plant the appropriate seed in the appropriate region of the field based on soil type or some other characteristic that affects seed growth and performance. A GPS (e.g., GPS receiver 195) can provide data to the monitor for generating the prescription map. The prescription map 600 can be coded in the same or similar manner as the components are coded in the embodiments discussed herein. For example, the hybrid key 620 can include a first color to indicate a first region for planting seed type "A" and a second color to indicate a second region for planting seed type "B." The first and second colors are used inside the field boundary 610 on the map 600. The first region on the prescription map may have a first soil type or characteristic while the second region may have a second soil type or characteristic.

Figure 7:
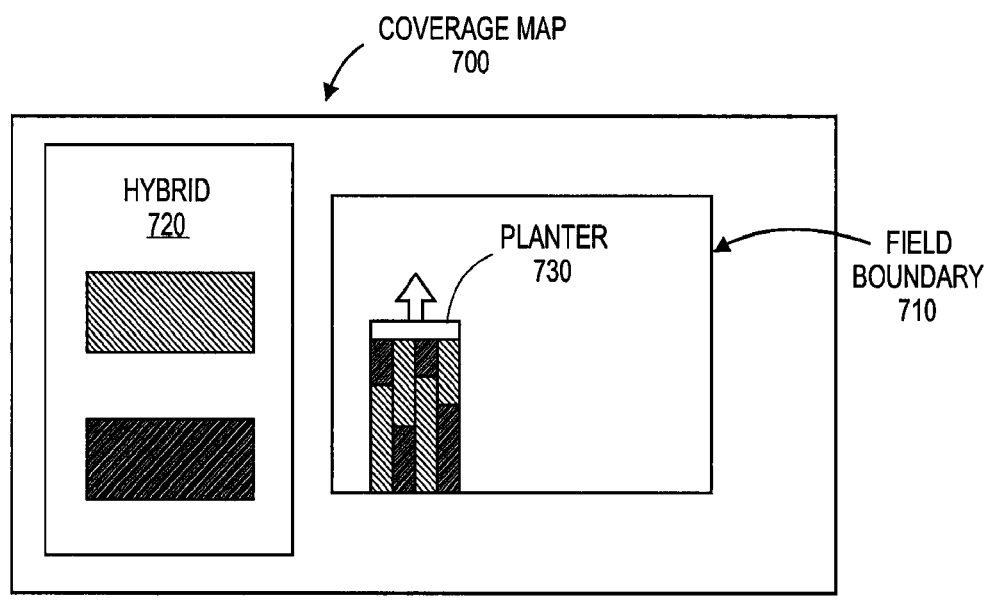
FIG. 7 illustrates an exemplary coverage map 700 in accordance with one embodiment.

FIG. 7 illustrates an exemplary seed coverage map 700 in accordance with one embodiment. The seed coverage map 700 is displayed on a monitor (e.g., planter monitor 190) in a tractor cab in order for the operator to see which type of seed variety has been planted in a particular region of the field. The seed coverage map 700 can be coded in the same or similar manner as the components are coded in the embodiments discussed herein. For example, the hybrid key 720 can include a first color to indicate a first region that has been planted with seed type "A" and a second color to indicate a second region that has been planted with seed type "B." The first and second colors are used inside the field boundary 710 on the map 700 and show the "as-planted" seed type in relation to a planter 730. The first color may indicate a first seed type while the second color indicates a second seed type. In one embodiment, the seed coverage map is updated dynamically in real-time as the planter moves through the field.

In one embodiment, the hybrid key 620 and the hybrid key 720 are consistent with the coding used in the system 400 of FIG. 4 so that the monitor provides a visual association between the coded components (e.g., the bulk hoppers 110) and the seed types being planted in the field. For example, if the bulk hopper 110a is coded with the color red, then the color red is used in the hybrid keys 620 and 720 to identify areas planted (or to be planted) with the seed type contained in bulk hopper 110a. In one such embodiment, when the process 800 described below is carried out, the processing logic (e.g., of a smart phone) used to carry out the process communicates (e.g., via a network interface) the seed type associated with (e.g., used to fill) a bulk hopper to the monitor 190 and the monitor 190 identifies the seed type adjacent to the corresponding color in the hybrid key 720.

In another embodiment, the seed coverage map is modified by optionally showing a secondary characteristic (e.g., seed population, depth, etc.). For example, the seed population may indicate a number of seeds planted per acre. The secondary characteristic may be mapped and displayed as a different color shade or pattern of the respective first or second color. For example, if a first color is red, then a red region planted at a higher population can be displayed as a dark red color. A red region planted at a lower population can be displayed as a light red color.

The different coding schemes disclosed herein such as a color scheme work with different patterns rather than colors. Additionally, each of the color-coded connectors could alternatively or additionally be designed so that a "first color" component or connector will not fit with a "second color" component or connector, etc. For example, a red seed type "A" fitting may include a pin sized to slidingly engage a slot in a corresponding red seed type "A" inlet (thus coupling the fitting to the inlet), but the red fitting pin is preferably too large to engage a slot in a non-corresponding inlet (e.g., a blue seed type "B" inlet) such that the red fitting will not connect with the non-corresponding inlet, preventing an operator error. Similar design may be used to prevent a red seed type "A" plug from operably engaging a blue seed type "B" plug.

Figure 8:
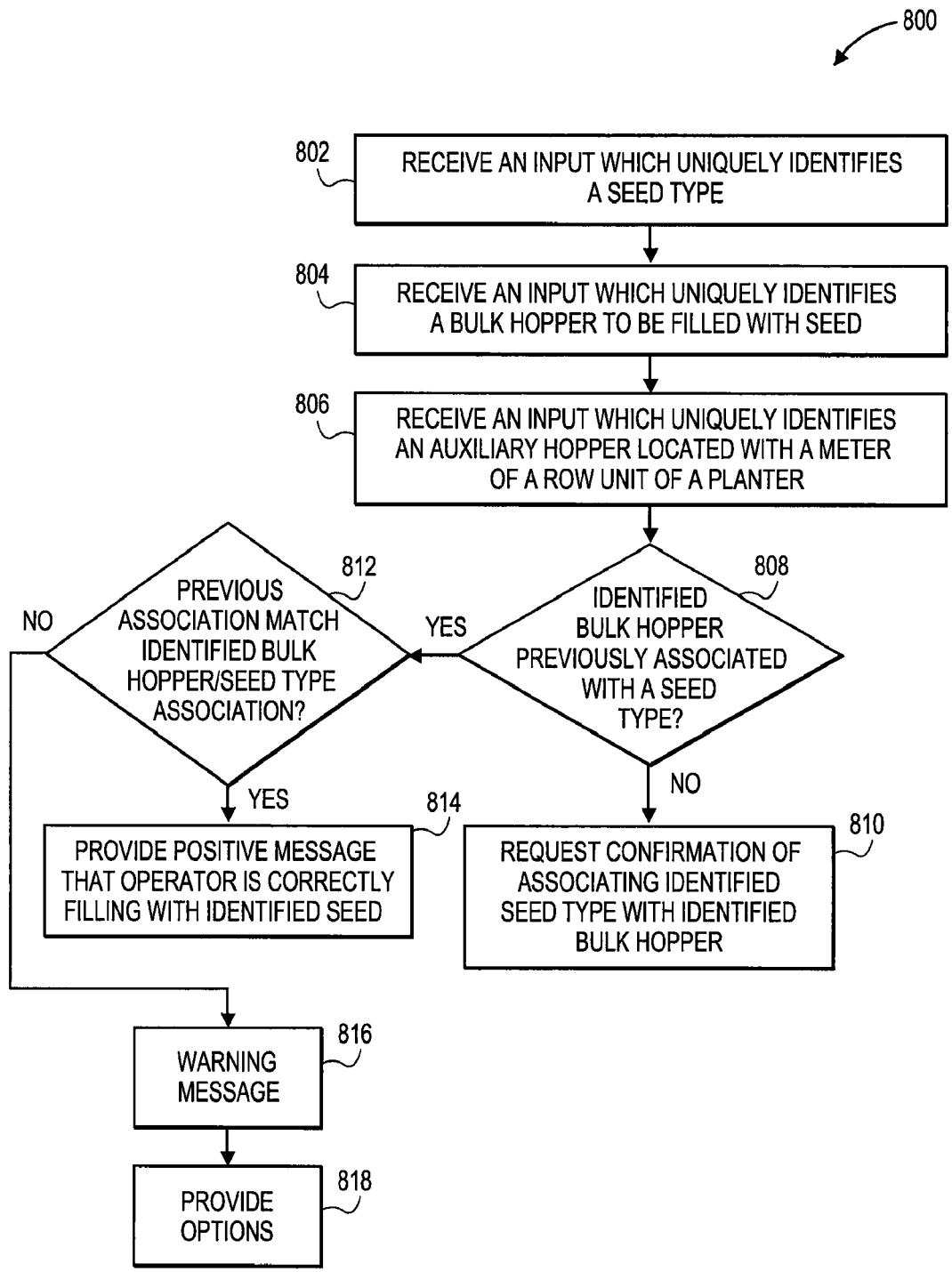
FIG. 8 illustrates a flow diagram of one embodiment for a method 800 of reducing a likelihood of operator error or preventing an operator error during the bulk hopper filling process.

FIG. 8 illustrates a flow diagram of one embodiment for a method 800 of "fool-proofing" or preventing an operator error during the bulk hopper filling process. The method 800 is performed by processing logic that may comprise hardware (circuitry, dedicated logic, etc.), software (such as is run on a general purpose computer system or a dedicated machine or a device), or a combination of both. In one embodiment, the method 800 is performed by processing logic of a smart cellular phone, mobile device, tablet device, or other electronic device that executes instructions of a software application with processing logic. The software application can be initiated by an operator and the following operations of method 800 may be performed.

At block 802, the processing logic receives an input (e.g., operator input, barcode) which uniquely identifies a hybrid seed type. The operator may use an electronic device having the software application to scan a barcode on a seed bag or on a large seed box used with mechanical seed tenders. The barcode uniquely identifies the seed type (i.e., seed variety). Alternatively, the operator can select the hybrid seed type using a user interface provided by the processing logic and the software application. For example, the operator can select the hybrid from a drop-down list provided by the software application of the electronic device.

At block 804, the processing logic receives an input (e.g., operator input, barcode) which uniquely identifies a bulk hopper of a planter that is being filled with seed. The operator may use the device to scan a barcode on a bulk hopper. The barcode uniquely identifies the bulk hopper (e.g., bulk hopper A, bulk hopper B, etc). The barcode can be in a similar location as the coding (e.g., color marking) that is illustrated on the bulk hoppers in FIG. 4. Alternatively, the barcode can be located in a different location. In an embodiment, the barcode is replaced with a color marking. Alternatively, the operator can indicate which hopper is being filled using a user interface provided by the processing logic and the software application. In another embodiment, the operator scans the barcode on the bulk hopper or selects the bulk hopper and then selects the hybrid from a drop-down list. At optional block 806, the processing logic receives an input (e.g., operator input, barcode) which uniquely identifies an auxiliary hopper located with a meter of a row unit of the planter. The auxiliary hopper holds a small amount of seed at the meter. The operator may use the device to scan a barcode on the auxiliary hopper. The barcode uniquely identifies the auxiliary hopper (i.e., auxiliary hopper A, auxiliary hopper B, etc) in order to determine the type of seed that is left in a meter when planting operations are completed.

At block 808, the processing logic determines whether the identified bulk hopper that is being filled by the operator has been previously associated with a seed type. If there is no previous association between the identified bulk hopper and a seed type in memory, then the processing logic generates a user interface that requests confirmation of associating the identified seed type with the identified bulk hopper at block 810.

If a previous association exists, then processing logic determines if the previous association matches the association between the identified hopper and the identified (scanned or selected) seed type at block 812. The processing logic at block 814 provides a user interface with a visual confirmation message that the operator is filling the right bulk hopper if a match occurs at block 812. Optionally, the processing logic may also generate an audio confirmation message.

If no match occurs at block 812, then the processing logic at block 816 provides a user interface with a visual warning message that the identified bulk hopper is associated with a different seed than the seed type that is being filled by the operator into the bulk hopper. Optionally, the processing logic may also generate an audio warning message. At block 818, the processing logic provides a user interface with multiple options. A first option is removing the previous association between seed type and identified hopper and then associate the identified hopper with a new seed type. A second option allows the operator to correct his error by scanning a code corresponding to the previously associated seed type. After completion of operations 810, 814, or 818, the processing logic may determine based on input received from the operator whether additional bulk hoppers and future filling operations need to be performed. If so, the operations of method 800 can be repeated. If no additional fill operations are needed and no seed is left in the bulk hopper or the meters, then processing logic may receive input from the operator that instigates a "flush" of all seed/hopper associations in order to avoid future warnings.

In some embodiments, the operations of the methods disclosed herein can be altered, modified, combined, or deleted. For example, the operation of block 804 can occur prior to the operation of block 802 of FIG. 8. The operation of block 806 may be removed. The methods in embodiments of the present invention may be performed with a device, an apparatus, or data processing system as described herein.

The device, apparatus, or data processing system may be a conventional, general-purpose computer system or special purpose computers, which are designed or programmed to perform only one function, may also be used.

Figure 9:
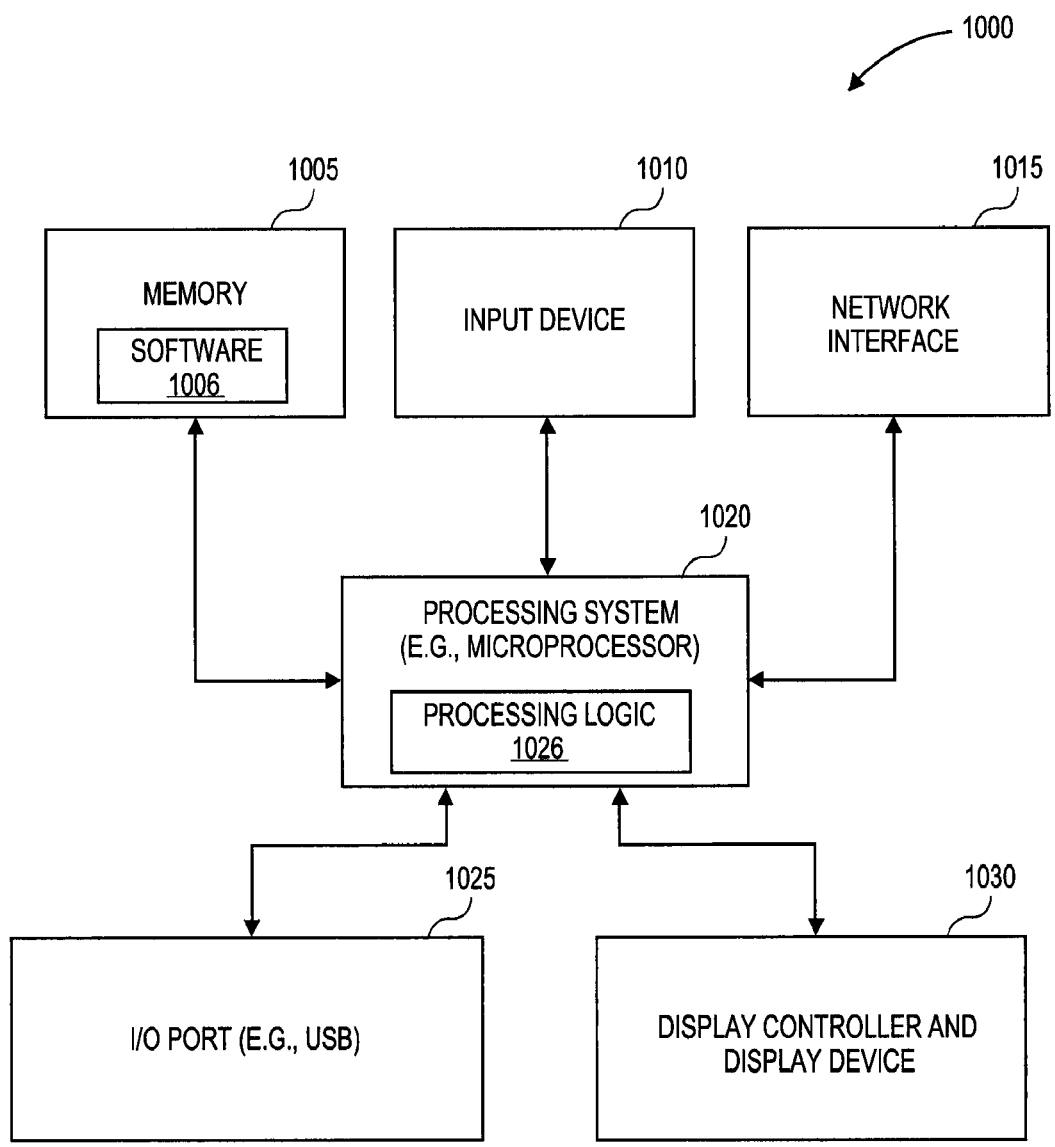
FIG. 9 shows an example of data processing system (e.g., device) in accordance with one embodiment.

FIG. 9 shows an example of data processing system (e.g., device) in accordance with one embodiment. For example and in one embodiment, the system may be implemented as a data processing device such a desktop computer, server, laptop, tablet, computer terminal, a handheld computer, a personal digital assistant, a cellular telephone, a camera, a smart phone, mobile phone, an email device, or a combination of any of these or other data processing devices.

In other embodiments, the data processing system may be a network computer or an embedded processing device within another device, or other types of data processing system having fewer components or perhaps more components than that shown in FIG. 9.

The data processing system 1000 shown in FIG. 9 includes a processing system 1020, which may be one or more microprocessors or which may be a system on a chip (integrated circuit) and the system also includes memory 1005 for storing data and programs for execution (software 1006) by the processing system. The memory 1005 can store, for example, the software components described above such as the software application for executing the operations of method 800 and memory 1005 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

A display controller and display device 1030 can provide a visual user interface for a user or operator. The system also can include a network interface 1015 to communicate with another data processing system. The network interface can be a WLAN transceiver (e.g., WiFi), an infrared transceiver, a Bluetooth transceiver, a wireless cellular telephony transceiver, Ethernet or other. It will be appreciated that additional components, not shown, may also be part of the system in certain embodiments, and in certain embodiments fewer components than shown in FIG. 9 may also be used in a data processing system. The system further can include one or more Input/Output (I/O) ports 1025 to enable communication with another data processing system or device. The I/O port may connect the data processing system to a USB port, Bluetooth interface, card reader, document scanner, printer etc.

The data processing system also can include one or more input devices 1010 which are provided to allow a user to provide input to the system. These input devices may be a keypad or a keyboard or a touch screen overlaid and integrated with a display device such as display device 1030. The input device may be used with an integrated image capture device to scan one or more barcodes from seed bags and components of a planting system as discussed herein. It will be appreciated that one or more buses, not shown, may be used to interconnect the various components as is well known in the art.

An article of manufacture may be used to store program code providing at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention. The specification and drawings are, accordingly, to be regarded in an illustrative sense rather than a restrictive sense.

The memory 1005 may be a machine-accessible non-transitory medium on which is stored one or more sets of instructions (e.g., software 1006) embodying any one or more of the methodologies or functions described herein. The software 1006 may also reside, completely or at least partially, within the memory 1005 and/or within the processing system 1020 during execution thereof by the system 1000, the memory and the processing system also constituting machine-accessible storage media. The software 1006 may further be transmitted or received over a network via the network interface device 1015.

In one embodiment, a machine-accessible non-transitory medium (e.g., memory 1005) contains executable computer program instructions which when executed by a data processing system cause the system to perform a method (e.g., method 800). The operations of the method include receiving an input (e.g., operator input, barcode) which uniquely identifies a hybrid seed type. The operator may use a device (e.g., system 1000) to scan a barcode on a seed bag or on a large seed box used with mechanical seed tenders. The barcode uniquely identifies the seed type (i.e., seed variety). Alternatively, the operator can select the hybrid seed type using a user interface generated by the processing logic and software 1006. The method includes receiving an input (e.g., operator input, barcode) which uniquely identifies a bulk hopper that is being filled with seed. The operator may use the device to scan a barcode on a bulk hopper. The barcode uniquely identifies the bulk hopper (i.e., bulk hopper A, bulk hopper B, etc). In an embodiment, the barcode is replaced with a color marking. Alternatively, the operator can indicate which hopper is being filled using the software application (e.g., software 1006) in the form of computer executable instructions. In another embodiment, the operator scans the barcode on the bulk hopper or selects the bulk hopper and then selects the hybrid from a drop-down list. The method optionally includes receiving an input (e.g., operator input, barcode) which uniquely identifies an auxiliary hopper located with a meter of a row unit of a planter. The operator may use the device to scan a barcode on the auxiliary hopper. The barcode uniquely identifies the auxiliary hopper (i.e., auxiliary hopper A, auxiliary hopper B, etc) in order to determine the type of seed that is left in a meter when planting operations are completed.

The method includes determining whether the identified bulk hopper that is being filled by the operator has been previously associated with a seed type. If there is no previous association between the identified bulk hopper and a seed type in memory of the device (e.g., memory 1005), then the processing logic generates a user interface that requests confirmation of associating the identified seed type with the identified bulk hopper.

The method further includes determining if there is a previous association between the identified bulk hopper and a seed type in memory. If the previous association matches the identified (scanned or selected) seed type, then the method provides a user interface with a visual confirmation message that the operator is filling the right bulk hopper. Optionally, the method may also generate an audio confirmation message.

If the previous association does not match the scanned or selected seed type, then the method provides a user interface with a visual warning message that the identified bulk hopper is associated with a different seed than the seed type that is being filled by the operator into the bulk hopper. Optionally, the method may also generate an audio warning message. The method provides a user interface with multiple options. A first option is removing the previous association between seed type and identified hopper and then associate the identified hopper with a new seed type. A second option allows the operator to correct his error by scanning a code corresponding to the previously associated seed type.

While the machine-accessible non-transitory medium (e.g., memory 1005) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A system for planting seed, comprising:
a first row unit configured to open a first planting trench;
a first seed meter having a first coded indicator with a first coding scheme, said first seed meter receiving a first seed type from a first hopper having a coded indicator with said first coding scheme, said first seed meter mounted to said first row unit; and
a second seed meter having a second coded indicator with a second coding scheme different from said first coding scheme, said second seed meter receiving a second seed type from a second hopper having a coded indicator with said second coding scheme, said second seed meter mounted to said first row unit;
wherein each of said coded indicators is disposed to be viewable and visually readable by an operator during planting operations.

2. The system of claim 1, further comprising:
a first outlet receiving seed from said first hopper, said first outlet having a coded indicator with said first coding scheme;
a second outlet receiving seed from said second hopper, said second outlet having a coded indicator with said second coding scheme;
a first line fitting configured to be removably attached to said first outlet, said first line fitting having a coded indicator with said first coding scheme; and
a second line fitting configured to be removably attached to said second outlet, said second line fitting having a coded indicator with said second coding scheme.

3. The system of claim 1, further comprising:
a first meter inlet receiving seed from said first hopper, said first meter inlet having a coded indicator with said first coding scheme;
a second meter inlet receiving seed from said second hopper, said second meter inlet having a coded indicator with said second coding scheme;
a first meter inlet fitting configured to be removably attached to said first meter inlet, said first meter inlet fitting having a coded indicator with said first coding scheme; and
a second meter inlet fitting configured to be removably attached to said second meter inlet, said second meter inlet fitting having a coded indicator with said second coding scheme.

4. The system of claim 1, further comprising:
a second row unit configured to open a second planting trench;
a third seed meter having a coded indicator with said first coding scheme, said third seed meter receiving said first seed type from said first hopper, said third seed meter mounted to said second row unit; and
a fourth seed meter having a coded indicator with said second coding scheme, said fourth seed meter receiving said second seed type from said second hopper, said fourth seed meter mounted to said second row unit.

5. The system of claim 4, further comprising:
a first splitter, said first splitter dividing flow of said first seed type between said first seed meter and said third seed meter; and
a second splitter, said second splitter dividing flow of said second seed type between said second seed meter and said fourth seed meter.

6. The system of claim 5, wherein said first splitter has a coded indicator with said first coding scheme, and wherein said second splitter has a coded indicator with said second coding scheme.

7. The system of claim 1, wherein said first coding scheme comprises one of a first color or a first pattern, and wherein said second coding scheme comprises one of a second color or a second pattern.

8. The system of claim 1, wherein said first coding scheme comprises a first alphanumeric coding scheme, and wherein said second coding scheme comprises a second alphanumeric coding scheme.

9. The system of claim 1, further comprising:
a planter monitor having a memory, a processor, and a user interface, wherein said planter monitor displays a spatial hybrid map including a first hybrid planting area and a second hybrid planting area, wherein said first hybrid planting area has a coded indicator with said first coding scheme, and wherein said second hybrid planting area has a coded indicator with said second coding scheme.

10. The system of claim 9, wherein said spatial hybrid map comprises a prescription map, wherein said planter monitor is configured to command said first and second seed meters to plant according to said prescription map.

11. The system of claim 9, wherein said spatial hybrid map comprises a coverage map.

12. The system of claim 9, wherein said first coding scheme comprises one of a first color or a first pattern, and wherein said second coding scheme comprises one of a second color or a second pattern.

13. The system of claim 9, further comprising:
an electrical harness;
a first drive driving said first seed meter;
a second drive driving said second seed meter;
a first pair of separable plugs cooperatively placing said electrical harness in communication with said first seed meter, wherein said first pair of separable plugs has a coded indicator with said first coding scheme, wherein said planter monitor transmits a first planting rate command to said first drive via said first pair of separable plugs; and
a second pair of separable plugs cooperatively placing said electrical harness in communication with said second seed meter, wherein said second pair of separable plugs has a coded indicator with said second coding scheme, wherein said planter monitor transmits a second planting rate command to said second drive via said second pair of separable plugs.

14. The system of claim 1, further comprising:
an electrical harness;
a first drive driving said first seed meter;
a second drive driving said second seed meter;
a first pair of separable plugs cooperatively placing said electrical harness in communication with said first seed meter, wherein said first pair of separable plugs has a coded indicator with said first coding scheme; and
a second pair of separable plugs cooperatively placing said electrical harness in communication with said second seed meter, wherein said second pair of separable plugs has a coded indicator with said second coding scheme.

15. A method of selectively planting different seed types in a field, comprising the steps of:
(a) receiving, via processing logic, an input which uniquely identifies a first seed type;
(b) receiving, via said processing logic, an input which uniquely identifies a bulk hopper to be filled with first seed type;
(c) receiving, via said processing logic, an input which uniquely identifies an auxiliary hopper associated with a seed meter of a row unit of a planter;
(d) determining, via said processing logic, whether said first seed type or another seed type has been stored in memory in association with said identified bulk hopper; and
(e) planting said first seed type from said identified bulk hopper upon determining that said row unit of said planter is located in the field in an area of a prescription map corresponding to said first seed type;
wherein said area of said prescription map has a coded indicator with a first coding scheme, wherein another area of said prescription map has a coded indicator with a second coding scheme different from said first coding scheme, wherein said identified bulk hopper has a coded indicator with said first coding scheme, and wherein said coded indicator is disposed to be viewable and is visually readable by an operator of the planter during planting operations.

16. The method of claim 15, wherein if said step (d) determines that said first seed type or another seed type has not been stored in memory in association with said identified bulk hopper, further comprising the step of:
requesting confirmation to associate said first seed type with said identified bulk hopper.

17. The method of claim 15, wherein if said step (d) determines that another seed type has been stored in memory in association with said identified bulk seed hopper, further comprising the step of:
displaying a warning message that another seed type has been associated with said identified bulk seed hopper.

* * * * *